J. W. GARRETT.
CASTER WHEEL FOR COTTON CHOPPERS.
APPLICATION FILED MAY 22, 1909.
935,598.
Patented Sept. 28, 1909.
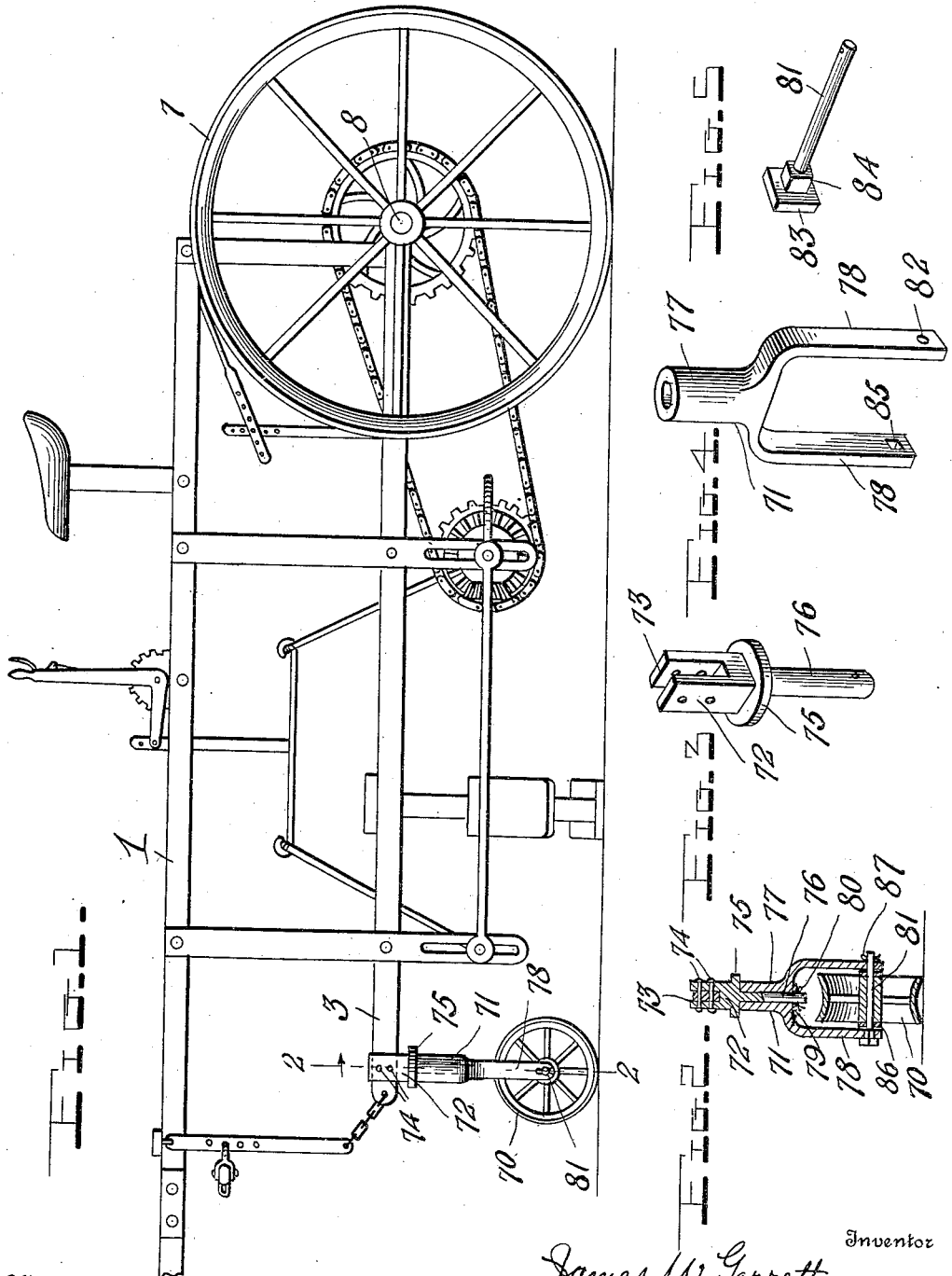

UNITED STATES PATENT OFFICE.

JAMES WILLIAM GARRETT, OF ELK CITY, OKLAHOMA.

CASTER-WHEEL FOR COTTON-CHOPPERS.

935,598.  Specification of Letters Patent.  Patented Sept. 28, 1909.

Application filed May 22, 1909. Serial No. 497,696.

*To all whom it may concern:*

Be it known that I, JAMES W. GARRETT, a citizen of the United States, residing at Elk City, in the county of Beckham and State of Oklahoma, have invented certain new and useful Improvements in Caster-Wheels for Cotton-Choppers, of which the following is a specification, reference being had to the accompanying drawings.

This invention relates to improvements in caster wheels for agricultural implements, and more particularly one especially designed for use on my cotton chopper set forth in Patent #913,373 granted February 23, 1909.

The object of the invention is to provide a simple and practical device of this character which will support the front end of the cotton chopper and take the weight of the same off of the draft animals.

With the above and other objects in view, the invention consists of the novel features of construction and the combination and arrangement of parts hereinafter fully described and claimed, and illustrated in the accompanying drawings, in which—

Figure 1 is a side elevation of my cotton chopper showing the application of the invention thereto; Fig. 2 is a detail vertical section taken on the plane indicated by the line 2—2 in Fig. 1; Figs. 3 and 4 are perspective views of the two members of the caster wheel hanger; and Fig. 5 is a similar view of the shaft for the wheel.

In the drawings 3 denotes one of the longitudinal bars or beams of the main frame 1 of the cotton chopper shown and described in Patent #913,373 granted to me February 23, 1909. Said frame 1 rests upon the rear axle 8 having supporting and drive wheels 7.

70 denotes my improved caster wheel for supporting the front end of the frame and relieving the draft animals of the weight of the same. Said wheel 70 is journaled in a hanger consisting of two members 71, 72, the latter of which has a forked or bifurcated upper end 73 to receive the side bars or beams 3 to which latter it is rigidly secured by transverse bolts, rivets or similar fastenings 74. The intermediate portion of the member 72 is formed with an enlargement or flange 75 from the center of which depends a cylindrical pivot 76. The latter receives a tubular bearing sleeve 77 upon the upper end of the hanger member 72, which latter has its lower end forked to provide spaced arms 78 between which the wheel 70 is arranged and journaled. The bearing sleeve 77 is retained on the pivot 76 by a washer 79 and a split pin 80. The hub of the wheel 70 receives a shaft 81 one end of which projects through an opening 82 in one of the arms 78 and at the other end of which is formed an enlarged head 83 and a squared or flat faced enlargement 84, which latter enters a similar-shaped opening 85 in the other arm 78. Washers 86 arranged on the shaft between the hub of the wheel and the arms 78 and said shaft is retained in said arms by a split pin 87.

From the foregoing it will be seen that my improved caster wheel is simple in construction and that it may be produced at a small cost and will be strong and durable. The peculiar construction and connection of the two hanger members enables the device to be readily applied to the beam of any cotton chopper or other agricultural implement and the rotatable connection between said members permit the wheel to turn freely in any direction.

Having thus described the invention what is claimed is:

The herein described caster wheel comprising a hanger having upper and lower members, the upper member having a rectangular body bifurcated to form spaced plates adapted to receive a beam between them and apertured for fastening bolts, said upper member having an integral cylindrical pivot depending from the bottom of said body portion, the lower end of said body portion having a transverse opening, said lower member of the hanger having a tubular cylindrical body portion to receive said pivot, the lower end of said tubular body portion being forked to provide spaced depending arms, one of the latter having a squared opening and the other an oppositely disposed circular opening, a split pin arranged in the transverse aperture or opening of the depending pivot of the upper member, a shaft passed through the openings in said arm and having at one end a transverse aperture and at its other end an enlarged head and a squared portion, the latter portion being arranged in a square opening in one of said arms to prevent said shaft from rotating, a split pin arranged in the aperture of said shaft to retain it in said arms, and a wheel proper rotatable upon said shaft and arranged between said arms.

In testimony whereof I hereunto affix my signature in the presence of two witnesses.

JAMES WILLIAM GARRETT.

Witnesses:
M. G. ROBINSON,
JOHN W. THOMAS.